Patented Nov. 16, 1926.

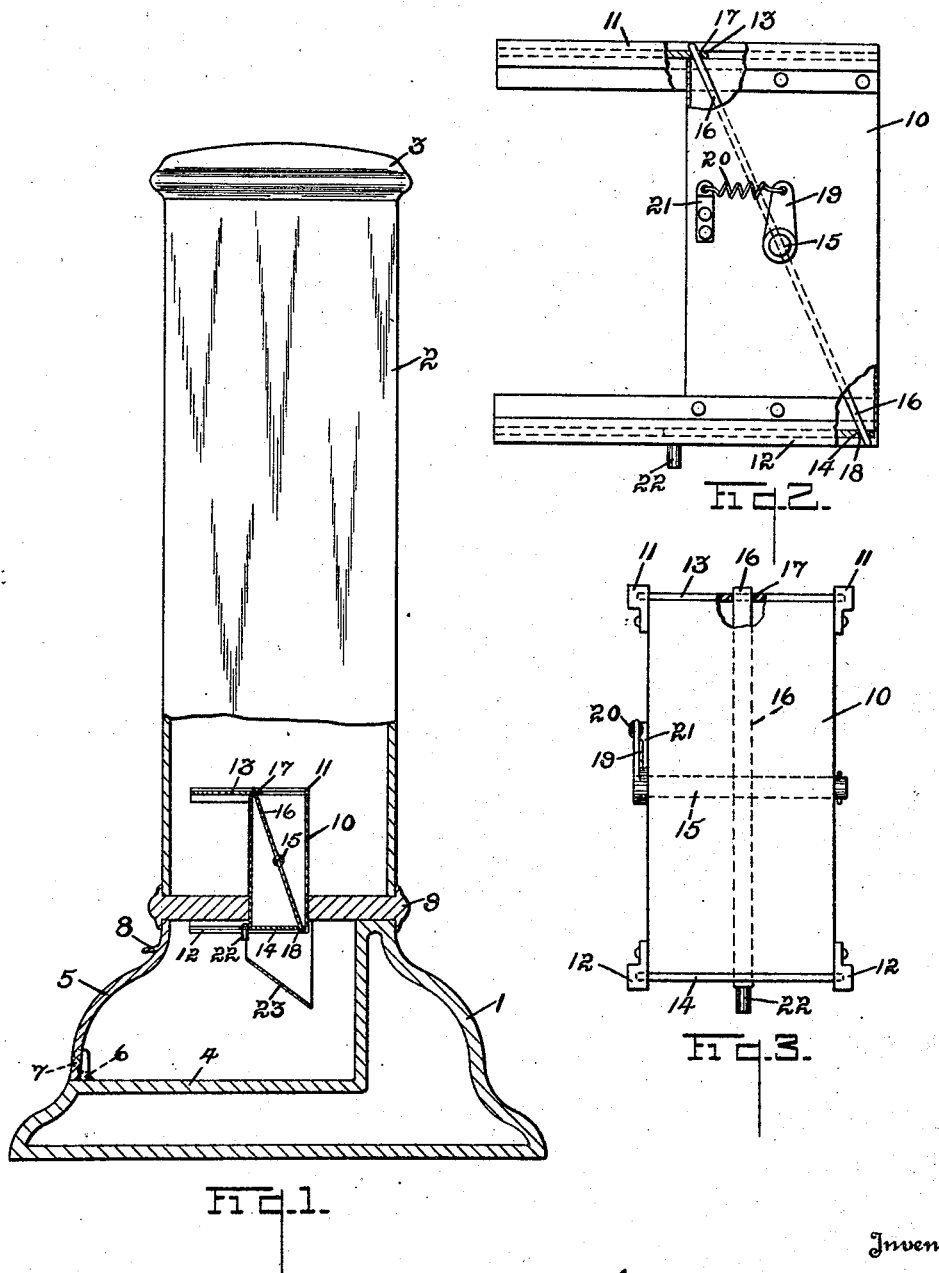

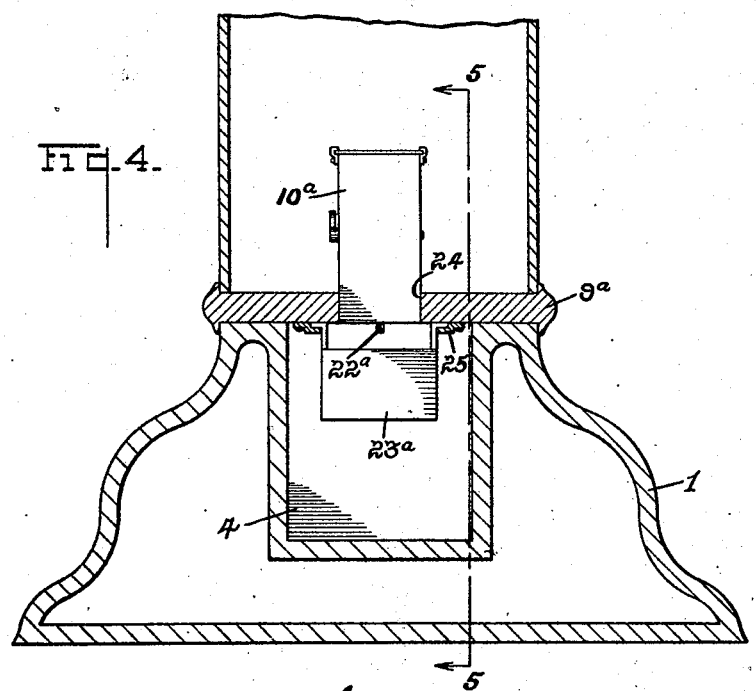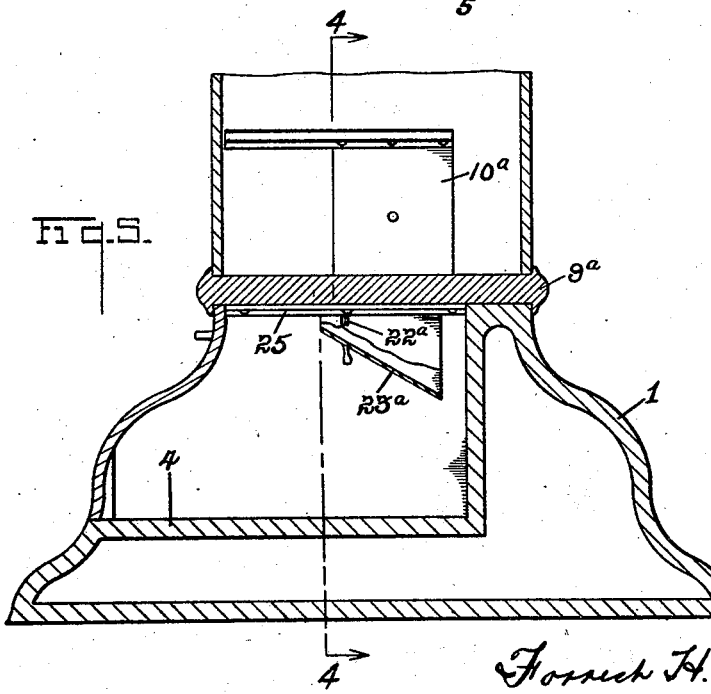

1,607,235

UNITED STATES PATENT OFFICE.

FORREST H. BRUNDAGE, OF TOLEDO, OHIO.

DEVICE FOR DISPENSING COFFEE AND OTHER MATERIALS.

Application filed February 8, 1926. Serial No. 86,685.

This invention relates to storage or dispensing containers for coffee, tea, beans or any other similar material, and is more particularly related to that class of containers which are semi-portable in their nature and usable and present an attractive and pleasing appearance, and objects of the invention are to provide a container of the above character having the new and improved features of construction, arrangement and operation hereinafter described.

An outstanding feature of the invention resides in the provision of a dispensing chamber which is adapted to contain a predetermined amount of the material, and in this connection, mechanism is provided for closing one end of this chamber and opening the other end. This mechanism is operable to open the closed end and concomitantly close the opposite end so that the material within the chamber may be dispensed therefrom without allowing the flow of additional material thereto.

This arrangement is obviously of advantage to store keepers in that the time and labor consumed in weighing or measuring material is eliminated and by merely moving a valve the desired amount of material is quickly dispensed. This construction is of pointed advantage in the dispensing of coffee because frequently coffee is sold in half pound or pound lots and by constructing the dispensing chamber in such a manner as to contain a half pound or pound, it will be seen that the ease and facility by which the coffee may be withdrawn and packaged will be of considerable advantage in the trade.

Furthermore, by utilizing a construction as above indicated, only fresh coffee is dispensed because the main storage chamber is kept insulated from the outside atmosphere as well so that only fresh coffee will pass into the dispensing chamber. This eliminates objections inherent in the usual type of bins employed for the purpose because it is practically impossible to determine whether fresh or stale coffee is from time to time added to the bins when the supply becomes low so that a portion of the old coffee remains in, and in scooping out the storekeeper does not know whether the fresh coffee or stale coffee is being sold.

Another characteristic of the invention resides in the provision of a chute or deflector for directing the coffee in such a manner that the receiving chamber is not filled to capacity when the dispensing chamber is opened. The advantage of this arrangement is obvious in that, should the storekeeper withdraw only a portion of the coffee from the receiving chamber, and, thereafter, desire to put back a part of that which he has taken out, the receiving chamber will not fill up to prevent the return of this excess coffee.

This invention also contemplates the provision of a receiving chamber from which coffee or other materials to be dispensed may be readily withdrawn. This is an improvement over other constructions, in that no material will get into corners from which it could not easily be scooped out. For this purpose the receiving chamber may be formed rectangularly and by this construction there are no hidden corners into which the material may pass to remain hidden.

Other advantages and features of this invention will be hereinafter apparent and the invention is shown by way of illustration in the accompanying drawings, in which:

Fig. 1 is a side elevation partly in section of a dispensing apparatus for coffee or other like material; Fig. 2 is an enlarged side elevation of the dispensing chamber with some parts broken away to show the valve arrangement and operative connections. Fig. 3 is a rear end view of the dispensing container; Fig. 4 is a vertical sectional view of another form of dispensing apparatus and taken on the line 4—4 of Fig. 5; and Fig. 5 is a vertical section on the line 5—5 of Fig. 4.

The illustrated embodiment of the invention comprises a base 1, a storage receptacle 2 which is suitably mounted on the base, and a cap 3 closing the upper end of the receptacle 2. The receptacle 2 is adapted to be filled after the cap 3 has been removed with coffee or other materials to be dispensed and if desired the receptacle 2 may consist of an elongate rectangular tube of glass through which the material may be readily seen. The base 1 may be also of glass molded into the desired shape and the top or cap 3 may be of aluminum or other suitable metal. In some instances it may be desirable securely to lock the cap 3 against unwarranted removing and any suitable means may be employed for this purpose.

Formed in the base 1 is a receiving chamber 4 into which the material from the storage receptacle 2 may pass and in this instance the chamber 4 is rectangular with an open outer end. Closing the outer end of the receiving chamber 4 is a door 5 which is shaped in such a manner as to conform to the general appearance of the base. The door 5 is removably attached to the base 1 and for this purpose pintles or pins 6 may project from the opposite ends of the door 5 into outwardly curved grooves 7 in the base. It will be seen that the door 5 is in this manner hinged to the base and when it is desired to remove the door from the base, this may be done by lifting the door upwardly and outwardly so that the pintles 6 ride in the grooves. A handle 8 may be fixed to the upper portion of the door for convenient manipulation.

Separating the base 1 and receptacle 2 is a spaced member 9 and connected to the upper surface of this member is a dispensing chamber or receptacle 10 having open upper and lower ends. The dimensions of the chamber 10 are so chosen as to receive a predetermined amount of material from the storage or receiving chamber 2. For example this chamber may be constructed to receive one pound of coffee although any suitable weight or measure may be utilized in accordance with the conditions of service.

Fixed to the upper and lower ends of the chamber 10 are guideways 11 and 12 respectively in which slide or gate valves 13 and 14 are respectively slidable. The valves 13 and 14 are so operated that when the valve 13 is closed the valve 14 is open and conversely when the valve 14 is closed the valve 13 is open. In this manner when the contents of the chamber 10 is being discharged into the receiving chamber 4 the upper end of the chamber is closed to the storage receptacle 2 to prevent the ingress of additional material and to enable a predetermined amount of material to be dispensed.

For operating the valves 13 and 14 a relatively small shaft 15 extends through the central portion of the chamber and has bearing in the opposite sides thereof. Fixed to the shaft 15 is a bar 16 which projects through openings 17 and 18 in the gate valves 13 and 14 respectively. Normally the bar 16 is inclined as indicated in Fig. 2 and by moving the valve 14 to the left to open the lower end of the chamber 10 the valve 13 is concomitantly closed. For automatically returning the valves to their normal position to close the lower end of the chamber 10, an arm 19 is fixed to one end of the shaft 15 and a coil spring 20 connects the outer end of the arm 19 to a bracket 21. It will thus be seen that the valve 14 is quickly snapped to closed position and the valve 13 is quickly opened after the former is released. For manipulating the valve 14 a depending pin 22 may be connected to this valve.

For directing the material from the dispensing chamber 10 into the rear portion of the receiving chamber 4 a chute or deflector 23 is connected to the underside of the spacer member 9 and is inclined toward the rear wall of the receiving chamber. This prevents an excess amount of material from being delivered to the receiving chamber.

In the modified form of the invention illustrated in Figs. 4 and 5 the spacer member $9^a$ is formed with a somewhat larger opening 24 through which material in the dispensing chamber $10^a$ may pass. Slidably mounted on the underside of the spacer member $9^a$ is a gate valve $14^a$ having a depending operating pin $22^a$, it being understood that the dispensing chamber is provided with gate valves and operating mechanism therefor, similar to that described heretofore in connection with the form shown in Figs. 1 to 3.

A chute or deflector $23^a$ is also provided in the region below the opening 24 for directing the material from the dispensing chamber $10^a$ into the rear end portion of the receiving chamber 4. In this construction the deflector $23^a$ is slidably mounted in channels 25 attached to the underside of the spacer member $9^a$ so that this member is movable in a direction longitudinal of the receiving chamber. By mounting the deflector $23^a$ in the adjustable manner indicated materials of different character may be readily dispensed without danger of too great a quantity of the material being supplied to the receiving chamber. For example, if coffee or beans were dispensed the deflector would be moved up relatively close to the rear wall of the receiving chamber, 4. The deflector remains in this position until other materials are dispensed, should it be desired to dispense materials such as rock candy, or other materials of greater bulk, the deflector may be moved outwardly toward the door 5 in the channels 25 so that the space between the inner end of the deflector and the rear wall of the receiving chamber is enlarged to permit these materials to pass into the receiving chamber more readily and without clogging the entire interior of this chamber.

While I have shown and described a construction which is the best form known to me at the present time, it is to be understood that numerous changes in details of construction, arrangement and operation may be effected without departing from the spirit of the invention, especially as defined in the appended claims.

What I claim as new and desire to secure by Letters Patent is:

1. A dispensing container comprising a base having a receiving chamber therein, a storage receptacle rising from said base, a partition between said base and storage receptacle, an open-ended tube carried by said partition and opening respectively into said storage receptacle and receiving chamber, transversely movable valves controlling the opposite ends of said open-ended tube, the lower valve normally closing the lower end of the tube and the upper valve being normally in open position, a connection between said valves whereby when said lower valve is moved to open position, the upper valve is concomitantly closed, and a deflector on the underside of said partition for directing material from said tube into the inner portion of said receiving chamber.

2. A dispensing container comprising a base having a rectangular receiving chamber, a transparent storage receptacle rising from said base, a partition between said storage receptacle and base, an open-ended tube carried by said partition and opening respectively into said storage receptacle and receiving chamber, transversely movable slide valves controlling the opposite ends of said open-ended tube, the lower valve normally closing the lower end of said tube and the upper valve being normally in open position, a shaft pivoted to the intermediate portion of said tube, a rod fixed centrally to said shaft with the end portions engaging corresponding portions of said valves whereby opening movement of the lower valve concomitantly imparts closing movement to the upper valve, and a deflector on the underside of said partition for directing material from said tube into the inner portion of the receiving chamber.

3. A dispensing container comprising a base member having a dispensing chamber, a storage chamber rising from said base member, a partition separating said base member and storage chamber provided with an opening therein, and a deflector disposed on the underside of said partition and movable transversely thereof, said deflector being inclined rearwardly toward the rear wall of said dispensing chamber whereby said deflector may be moved closer to or farther away from said rear wall to permit different sized articles or materials to pass into the dispensing chamber.

In testimony whereof I have hereunto signed my name to this specification.

FORREST H. BRUNDAGE.